United States Patent [19]

Henson et al.

[11] Patent Number: 5,285,451
[45] Date of Patent: Feb. 8, 1994

[54] FAILURE-TOLERANT MASS STORAGE SYSTEM

[75] Inventors: Larry P. Henson, Santa Clara; Kumar Gajjar, San Jose; David T. Powers, Morgan Hill; Thomas E. Idleman, Santa Clara, all of Calif.

[73] Assignee: Micro Technology, Inc., Sunnyvale, Calif.

[21] Appl. No.: 914,662

[22] Filed: Jul. 15, 1992

Related U.S. Application Data

[63] Continuation of Ser. No. 505,622, Apr. 6, 1990, Pat. No. 5,134,619.

[51] Int. Cl.5 .................................. G06F 11/10
[52] U.S. Cl. ..................... 371/11.1; 371/40.1
[58] Field of Search ........... 371/11.1, 11.2, 40.1, 371/51.1; 395/575; 370/42, 43, 85.1

[56] References Cited

U.S. PATENT DOCUMENTS

| | | | |
|---|---|---|---|
| 3,988,543 | 10/1976 | Dall'olio et al. | 370/53 |
| 4,112,502 | 9/1978 | Scheuneman | 371/40.1 |
| 4,212,080 | 7/1980 | Milliken | 364/900 |
| 4,736,376 | 4/1988 | Stiffler | 371/3 |
| 4,807,183 | 2/1989 | Kung et al. | 364/900 |
| 4,807,184 | 2/1989 | Shelor | 364/900 |
| 4,885,741 | 12/1989 | Douskalis | 370/85.1 |
| 4,899,342 | 2/1990 | Potter et al. | 371/10.1 |
| 4,924,458 | 5/1990 | Obara | 370/58.1 |
| 4,989,205 | 1/1991 | Dunphy, Jr. et al. | 371/10.1 |
| 4,989,206 | 1/1991 | Dunphy, Jr. et al. | 371/10.1 |

*Primary Examiner*—Charles E. Atkinson
*Attorney, Agent, or Firm*—Townsend and Townsend Khourie and Crew

[57] ABSTRACT

A mass memory system for digital computers is disclosed. The system has a plurality of disk drives coupled to a plurality of small buffers. An Error Correction Controller is coupled to a plurality of X-bar switches, the X-bar switches being connected between each disk drive and its buffers. Data is read from and written to the disk drives in parallel and error correction is also performed in parallel. The X-bar switches are used to couple and decouple functional and nonfunctional disk drives to the system as necessary. Likewise, the buffers can be disconnected from the system should they fail. The parallel architecture, combined with a Reed-Solomon error detection and correction scheme and X-bar switches allows the system to tolerate and correct any two failed drives, allowing for high fault-tolerance operation.

9 Claims, 12 Drawing Sheets

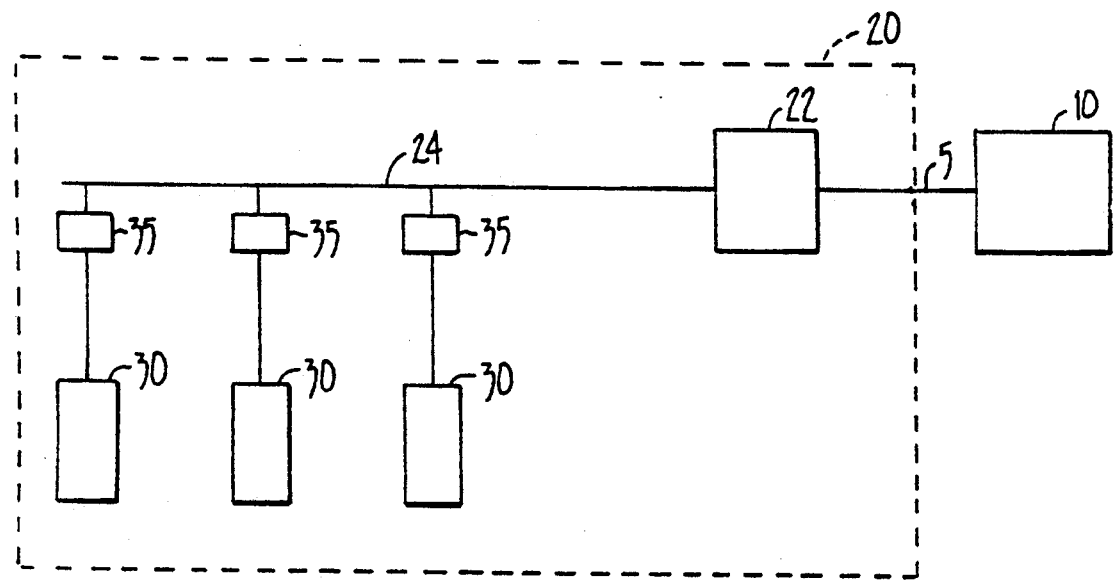
FIG._1. (PRIOR ART)
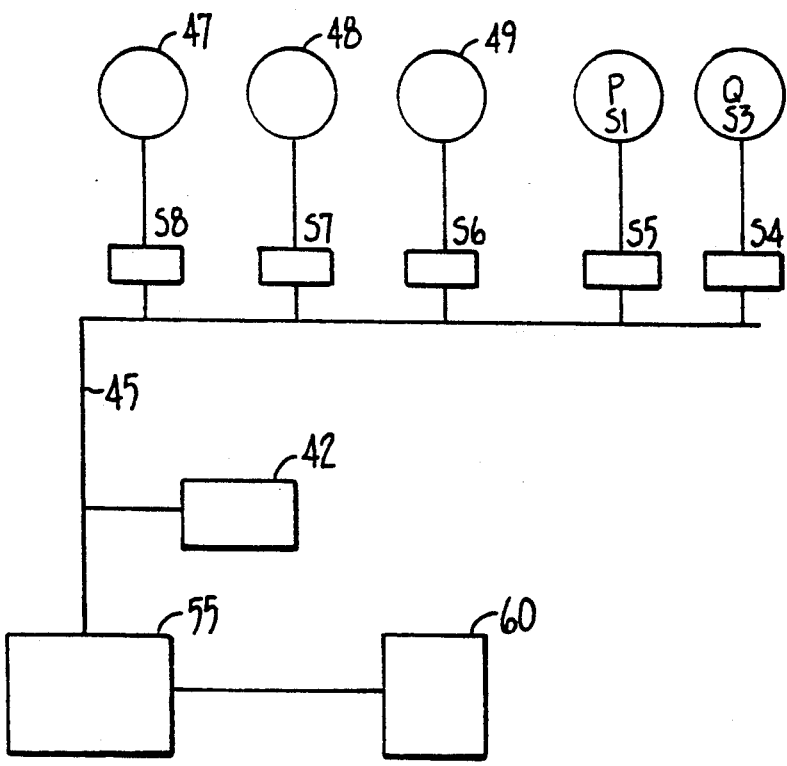
FIG._2. (PRIOR ART)

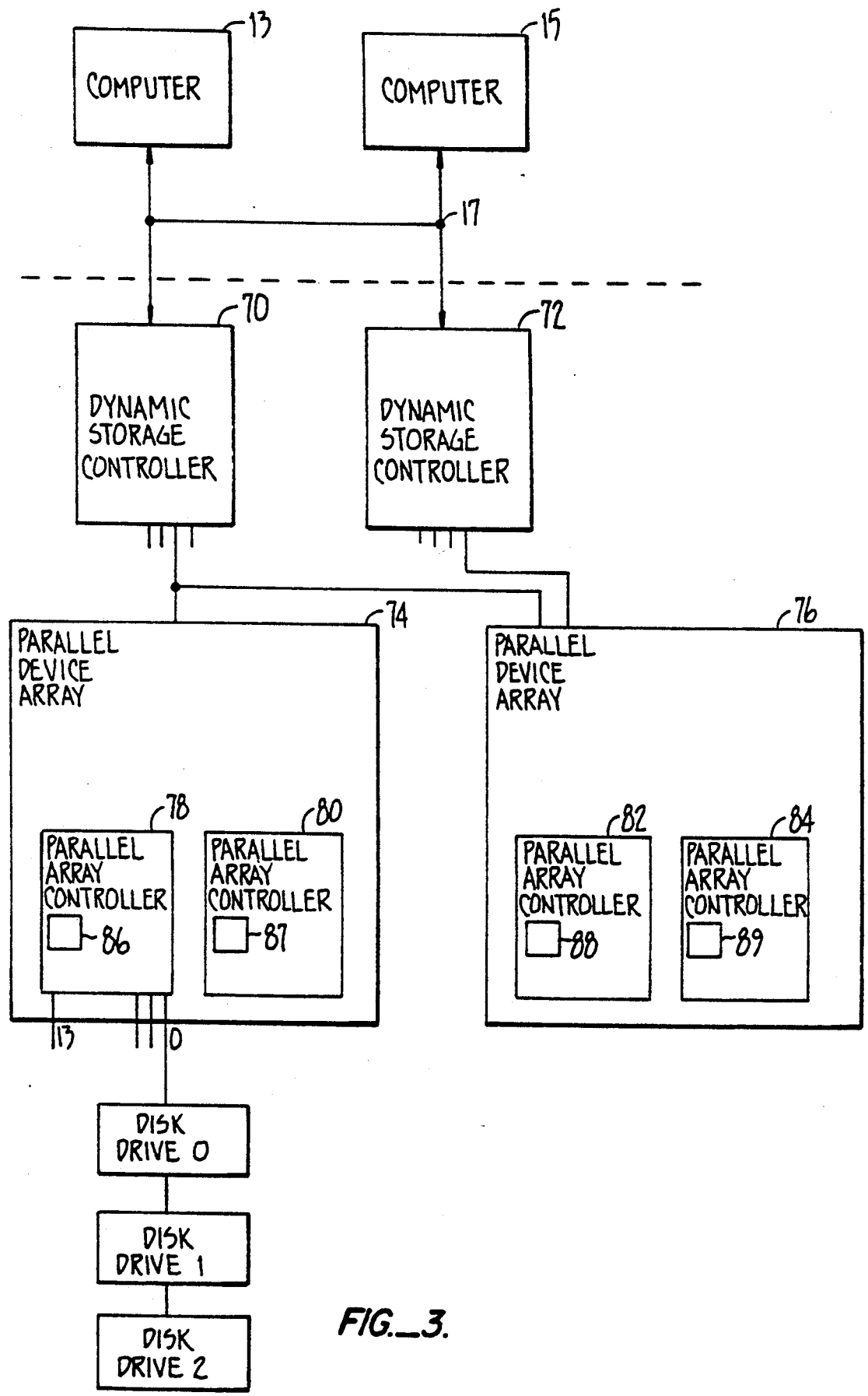
FIG._3.

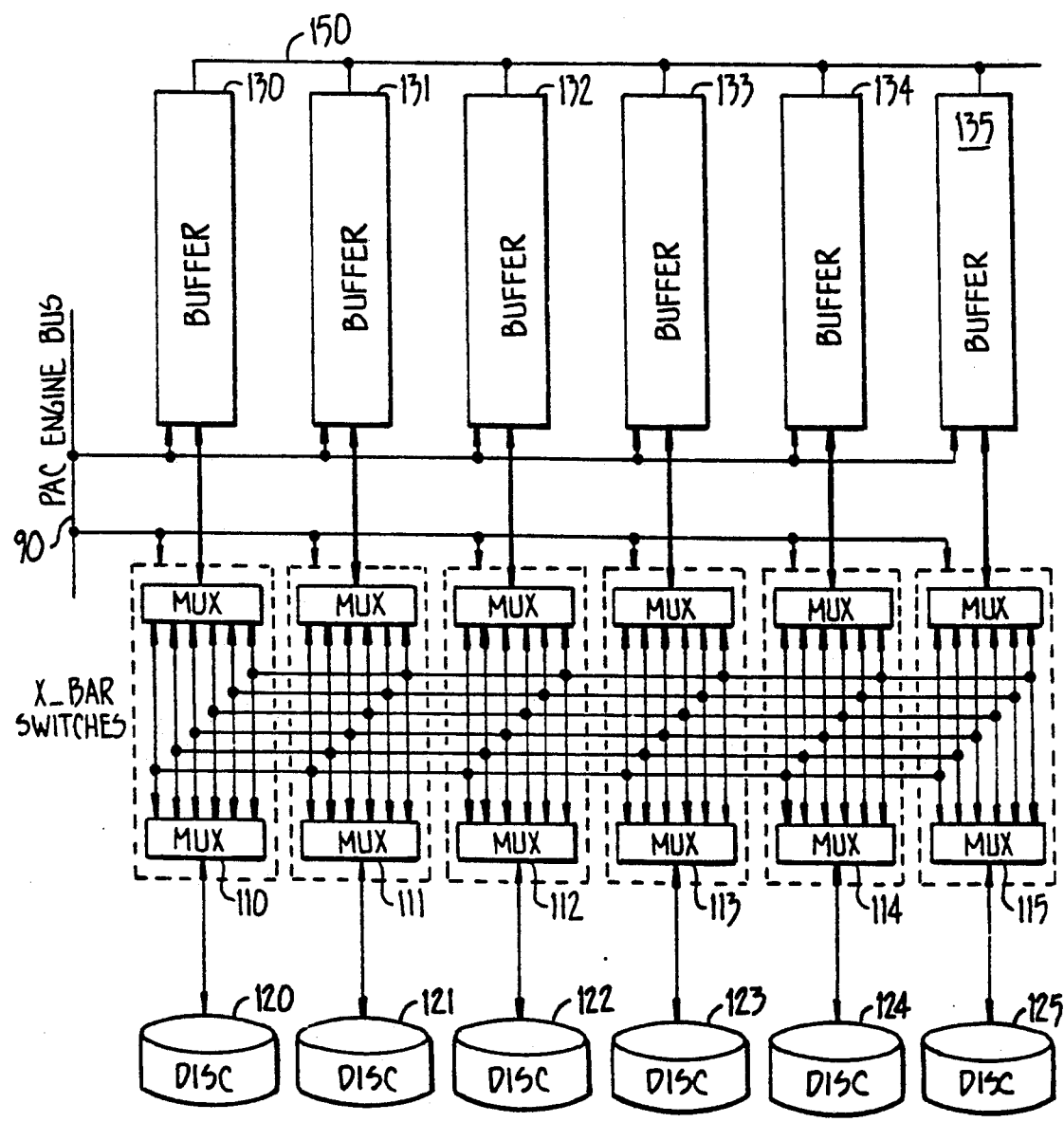
FIG._4.

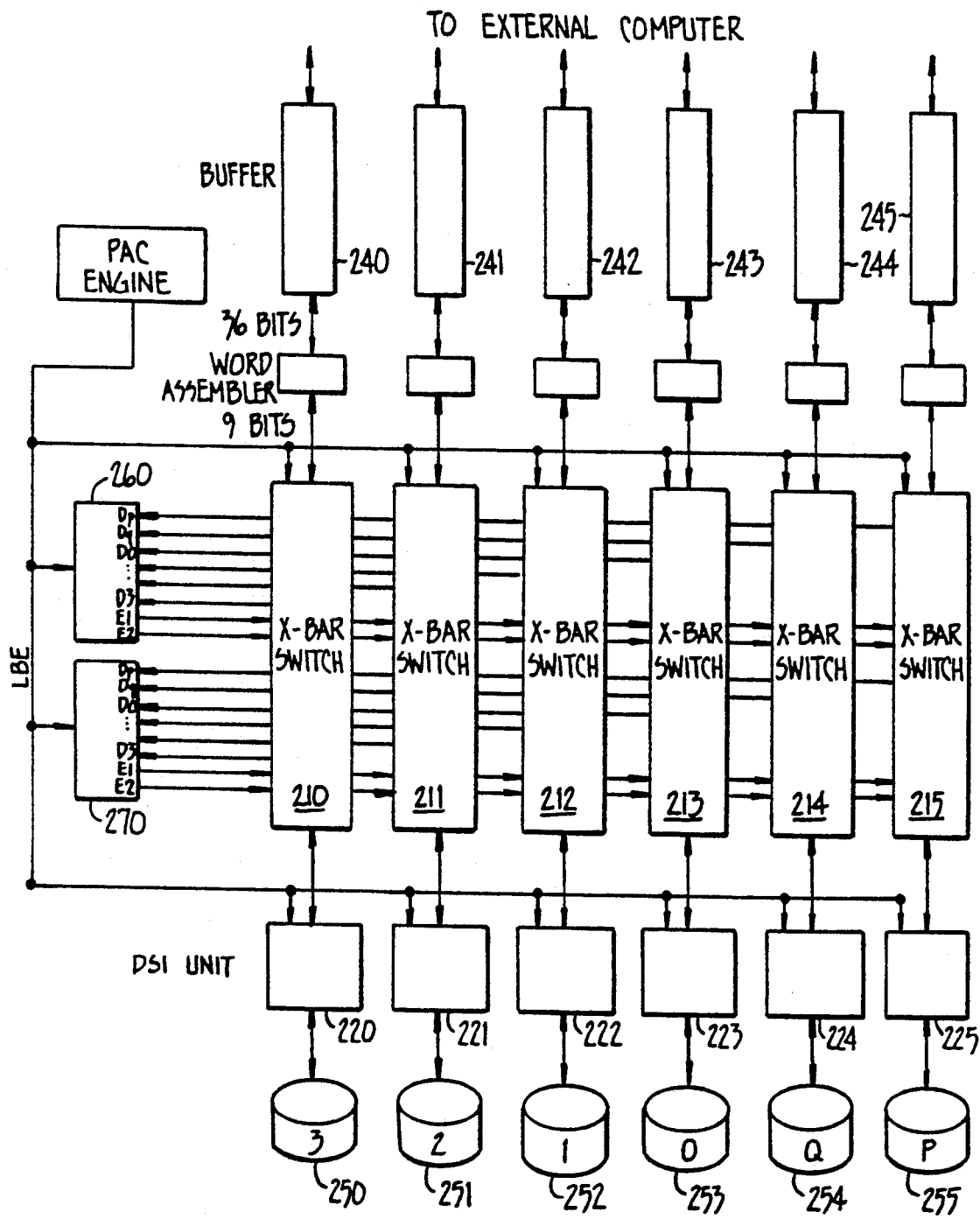
FIG._5.

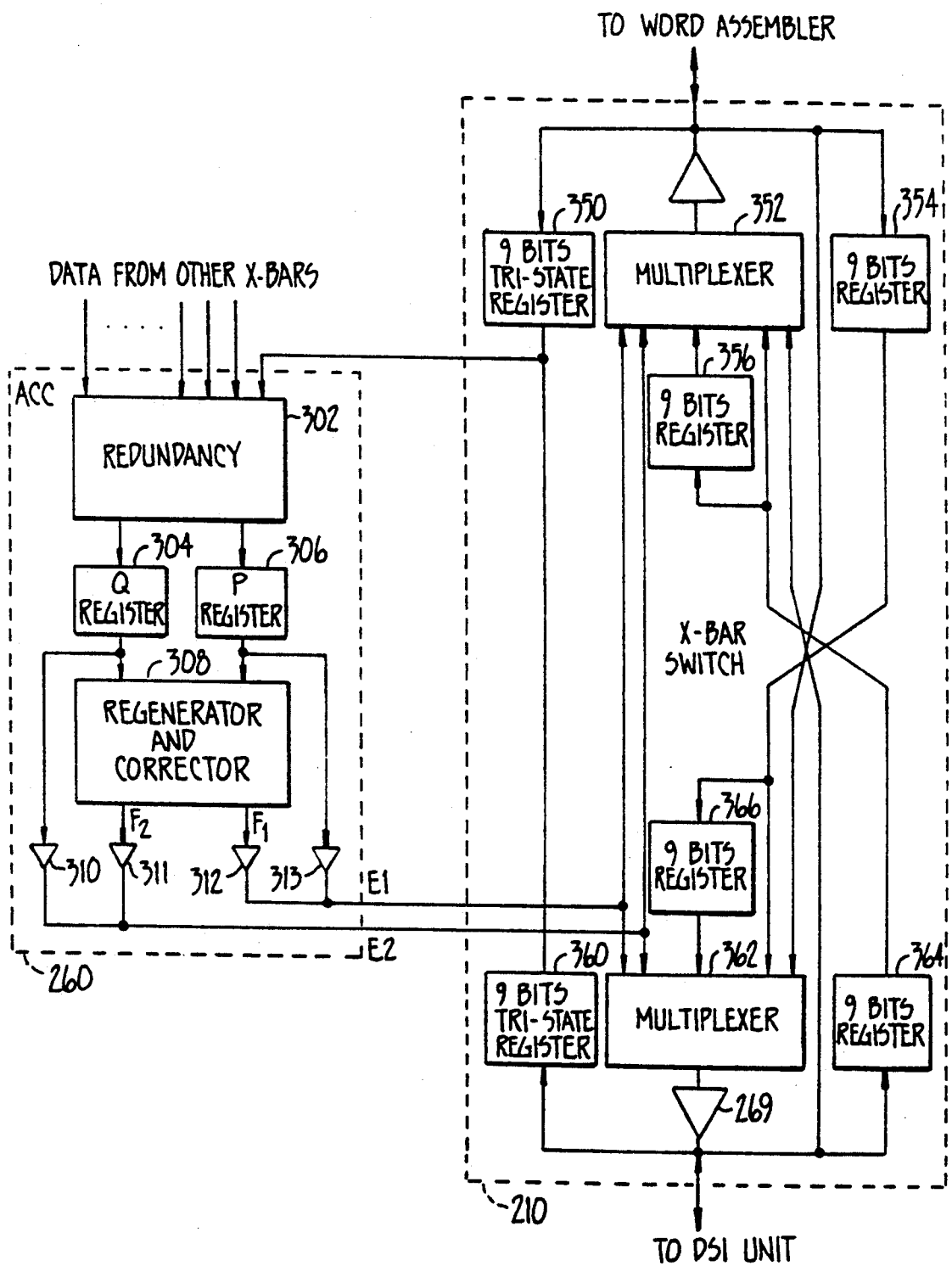
FIG._6.

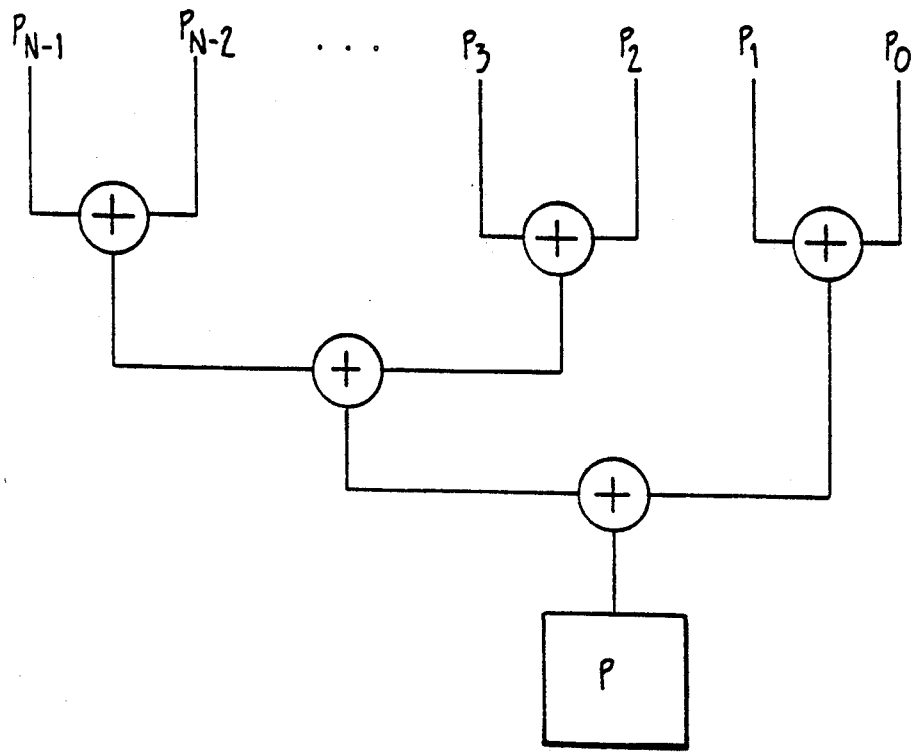
FIG._7a.
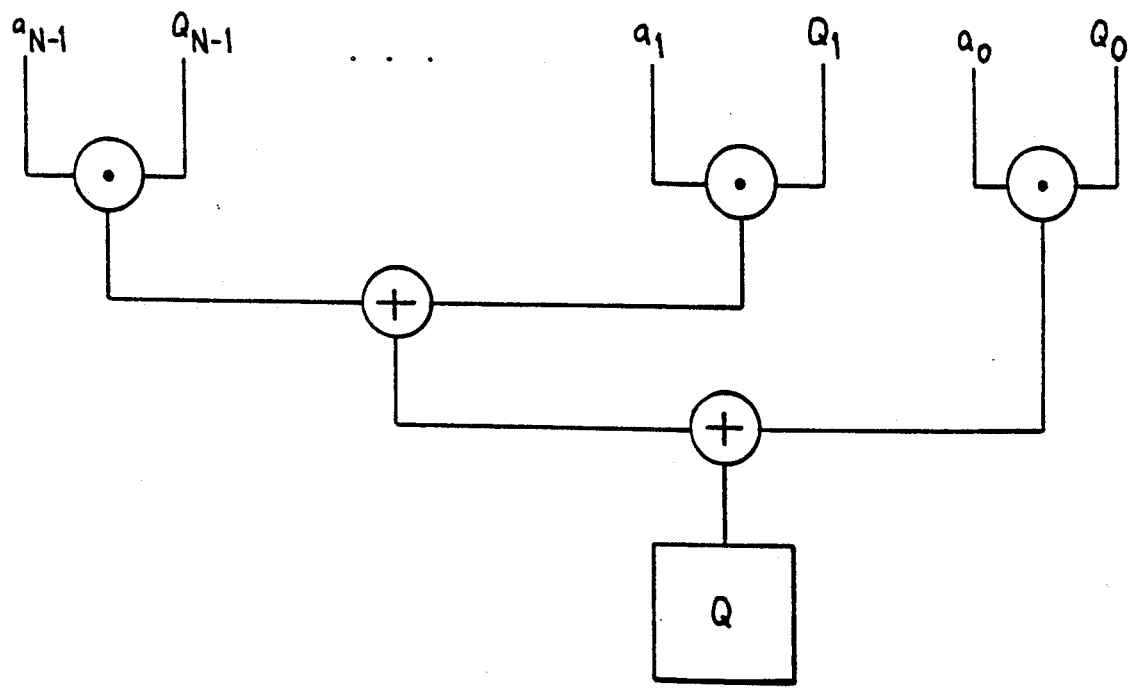
FIG._7b.

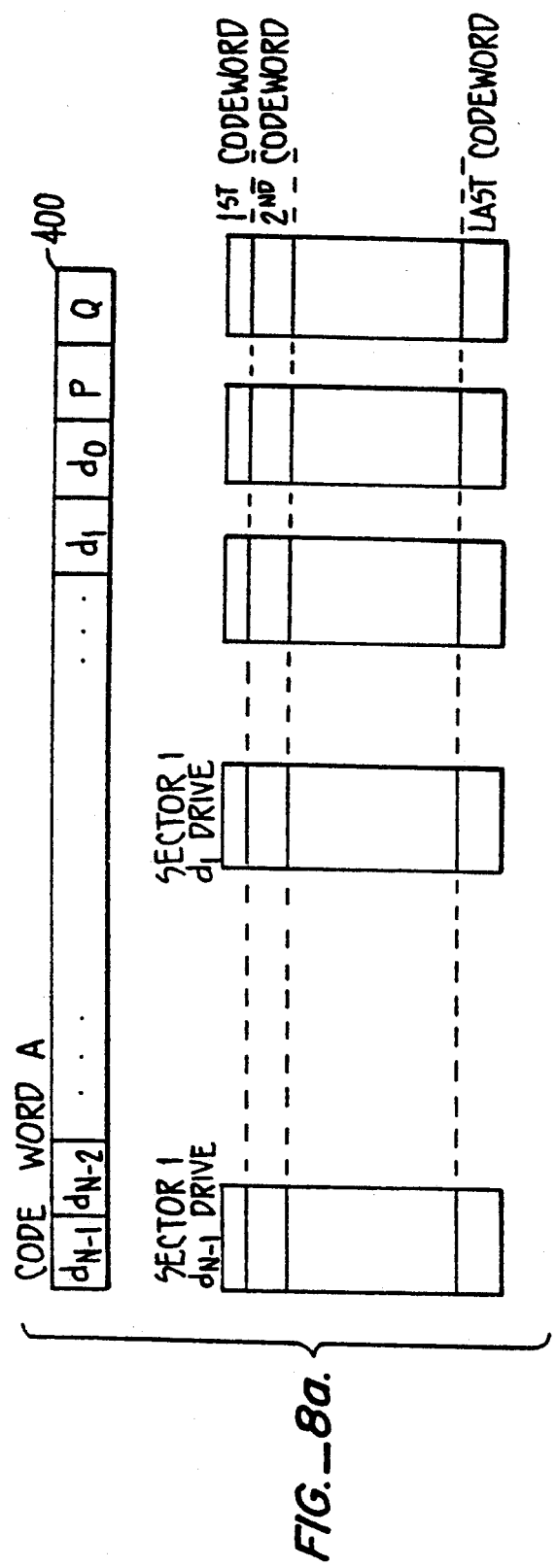
FIG._8a.
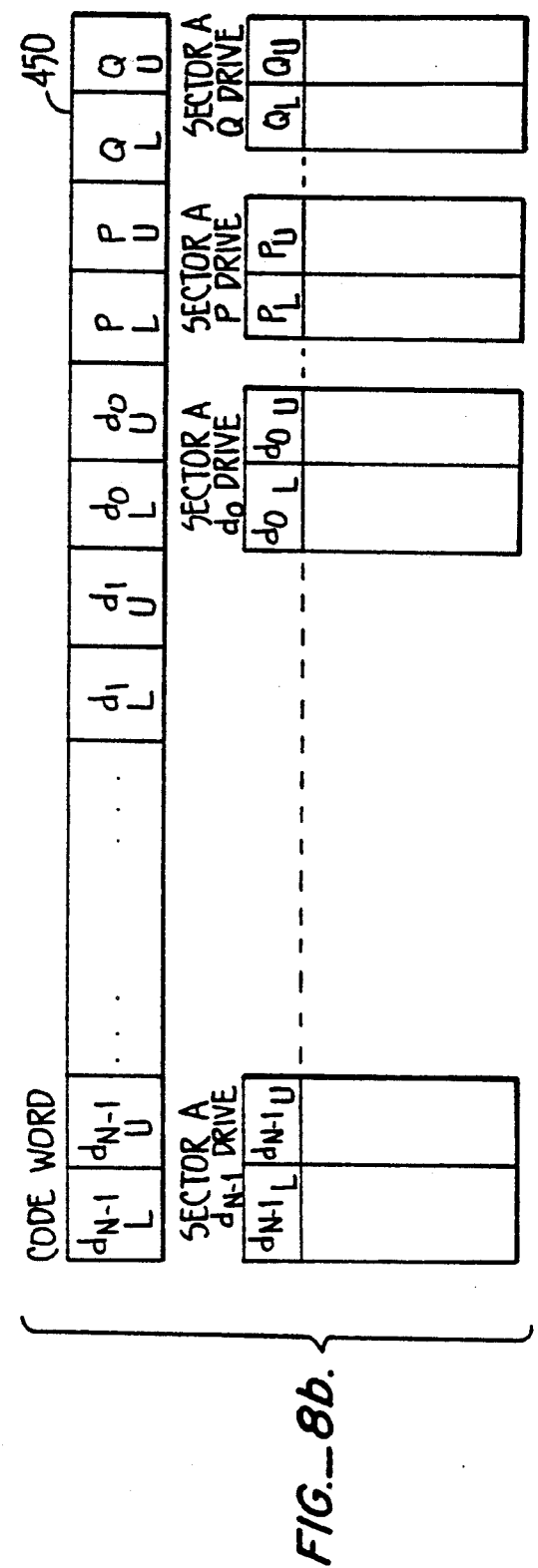
FIG._8b.

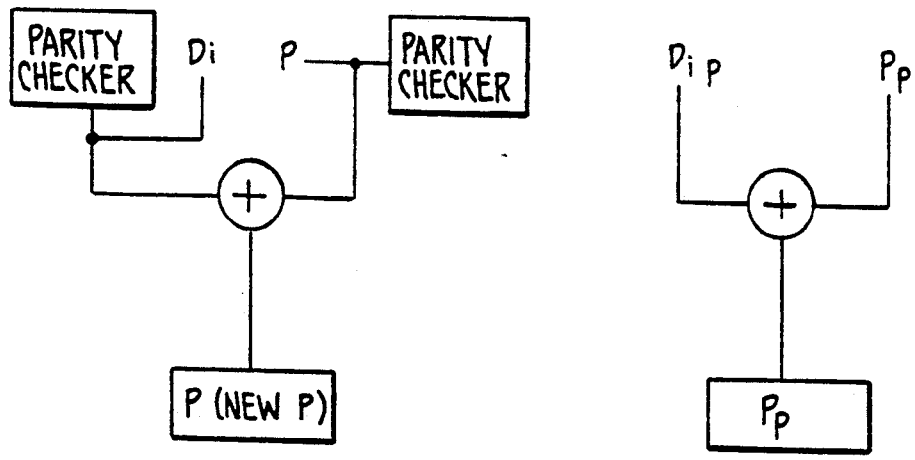
FIG._9a.
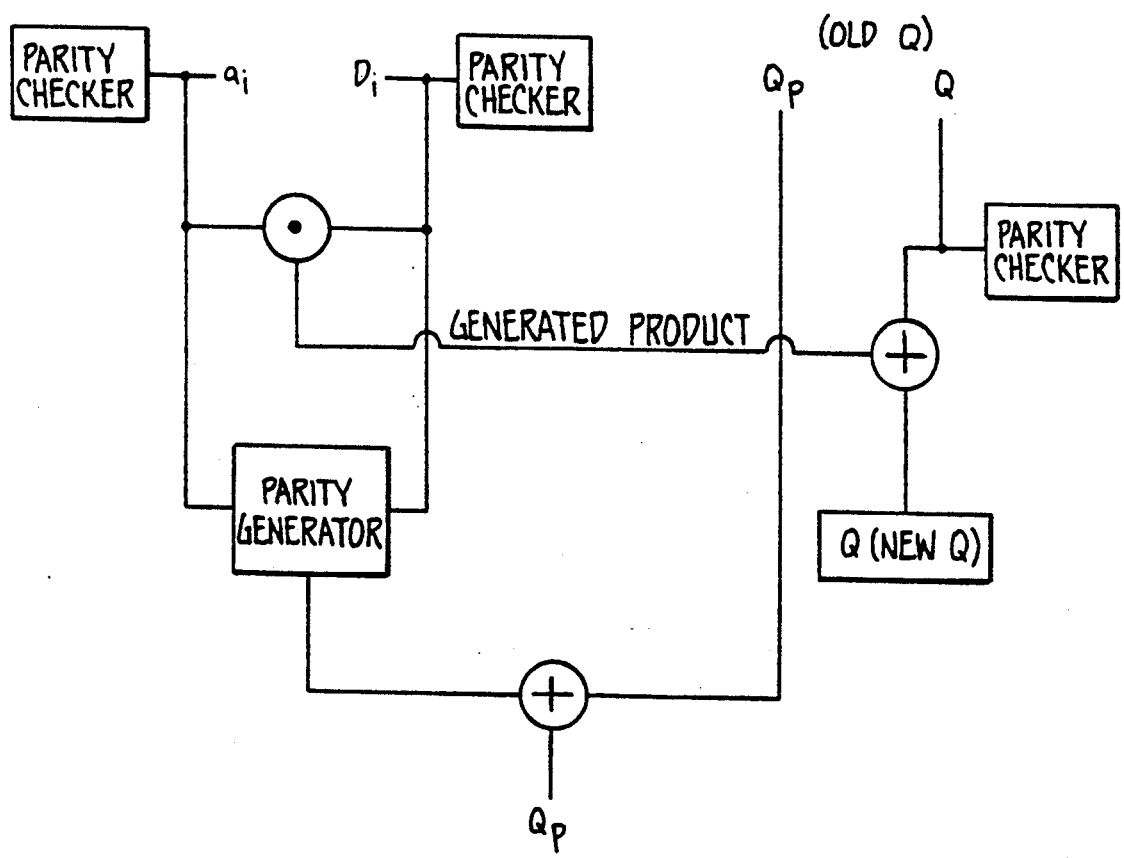
FIG._9b.

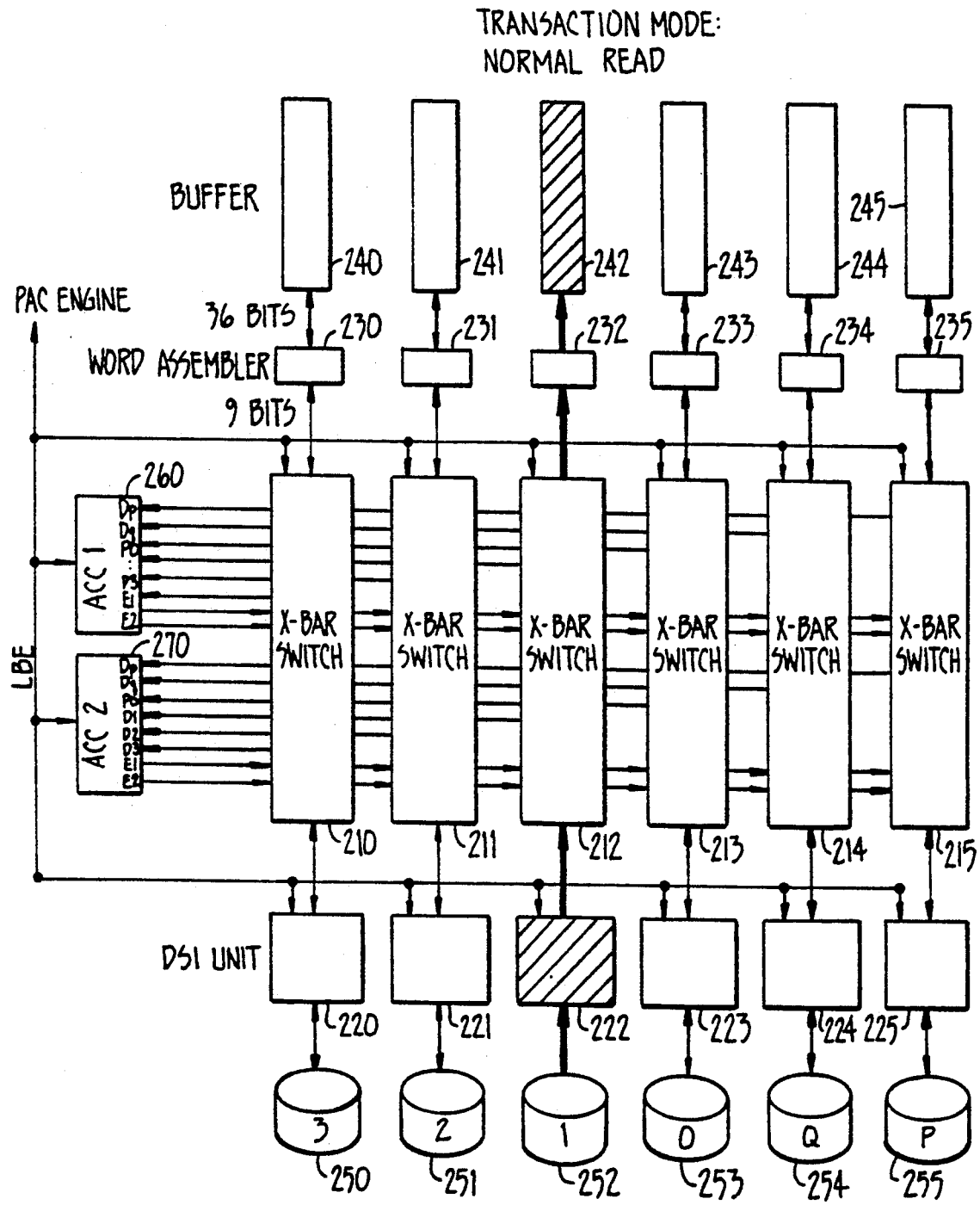
FIG._10.

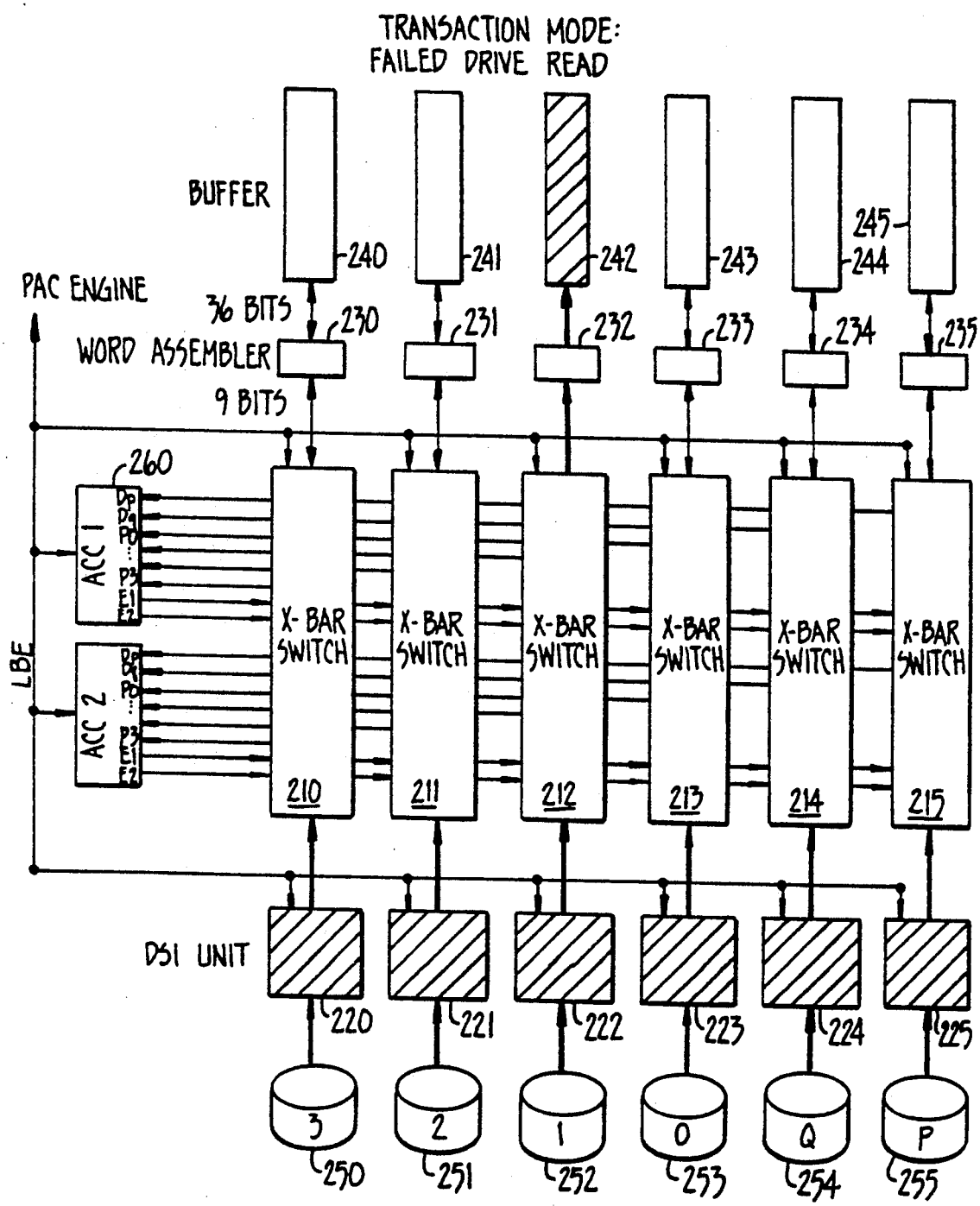
FIG._11.

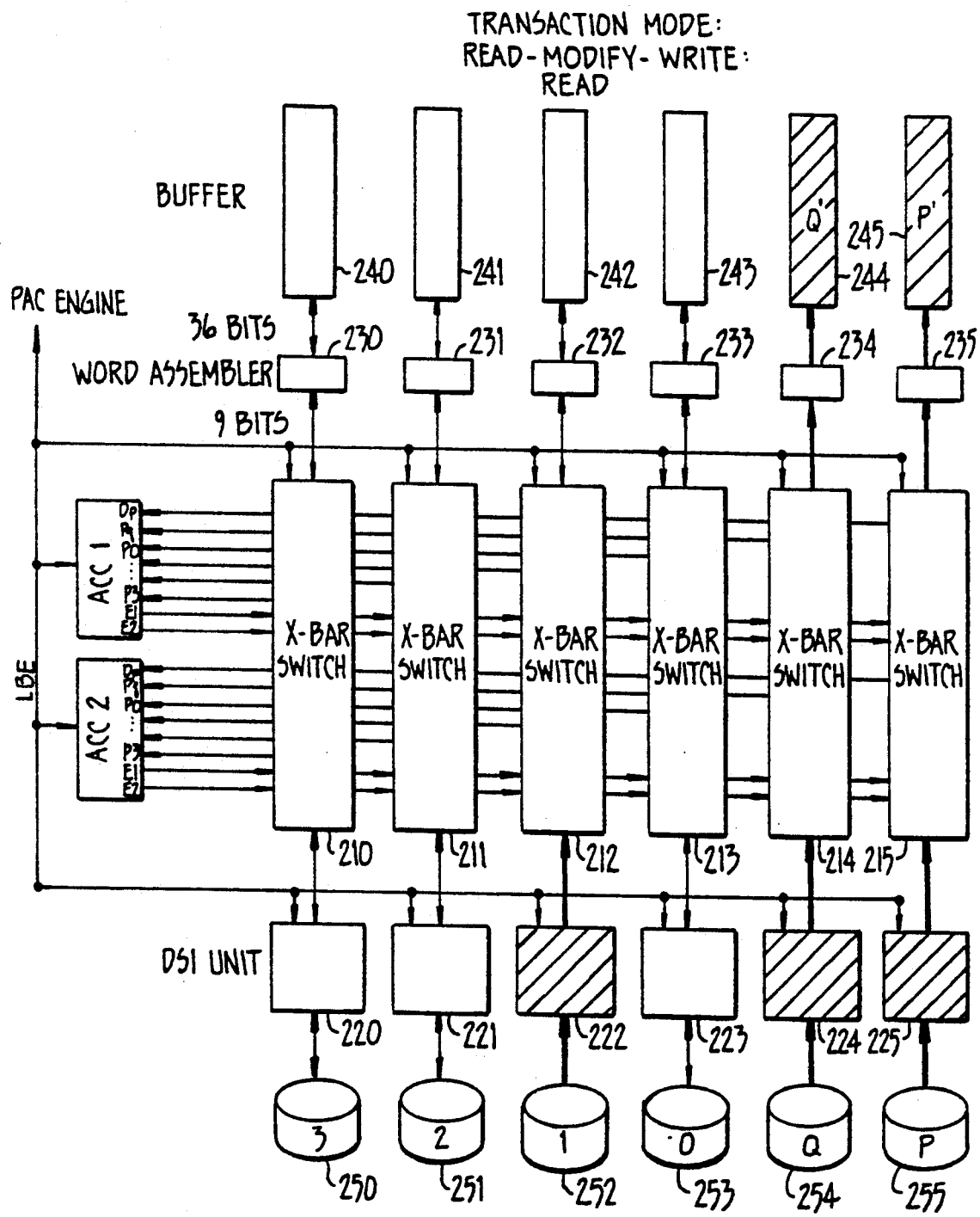
FIG._12.

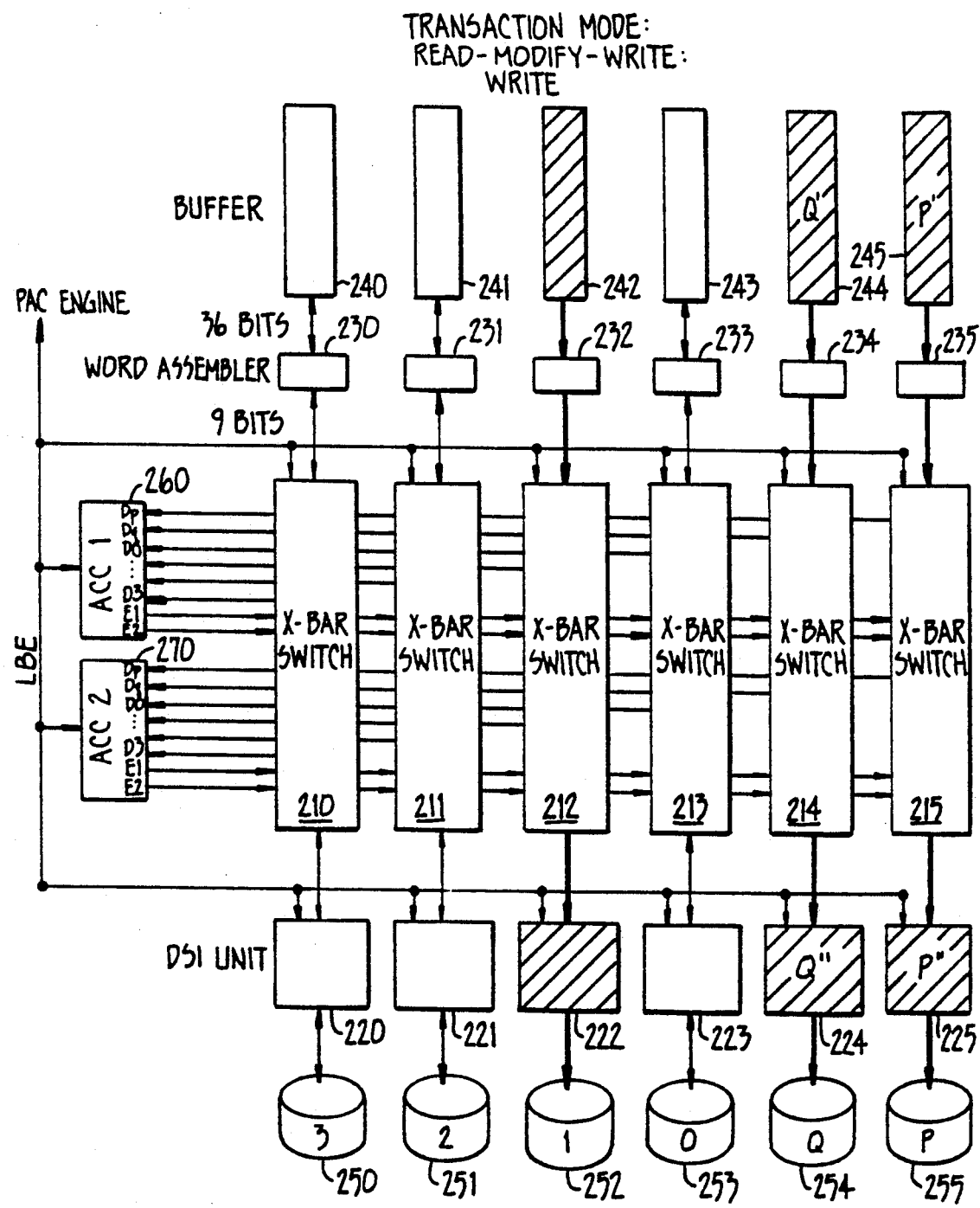
FIG._13.

FAILURE-TOLERANT MASS STORAGE SYSTEM

This is a continuation of application Ser. No. 07/505,622 filed Apr. 6, 1990, now U.S. Pat. No. 5,134,619.

BACKGROUND OF THE INVENTION

Field of the Invention

This invention is in the field of mass data storage systems for digital computers. Specifically, it is a control system for use with a plurality of disk drive memories, the memories being controlled in parallel and the control system being capable of detecting and correcting data transmission errors and disk drive failures without interrupting the operation of the system.

Description of the Relevant Art

Magnetic disk drive memories for use with digital computer systems are known. Although many types of disk drives are known, the present invention will be described as using hard disk drives. Nothing herein should be taken to limit the invention to that particular embodiment.

Many computer systems use a plurality of disk drive memories to store data. A common known architecture for such systems is shown in FIG. 1. Therein, computer 10 is coupled by means of bus 15 to disk array 20. Disk array 20 is comprised of large buffer 22, bus 24, and a plurality of disk drives 30, each disk drive having an associated disk controller 35. Bus 24 interconnects buffer 22 and the disk controllers. Each disk drive 30 is accessed and the data thereon retrieved individually. The disk controller 35 associated with each disk drive controls the input/output operations for the particular disk drive to which it is coupled. Data placed in buffer 22 is available for transmission to computer 10 over bus 15. When the computer transmits data to be written on the disks, controllers 35 receive the data for the individual disk drives 30 from bus 24. In this type of system, disk operations are asynchronous in relationship to each other.

All disk operations, in particular writing and reading, have an associated probability of error. Procedures and apparatus have been developed which can detect and, in some cases, correct the errors which occur during the reading and writing of the disks. With relation to a generic disk drive, the disk is divided into a plurality of sectors, each sector having the same, predetermined size. Each sector has a particular header field, which gives the sector a unique address, a header field code, the header field code allowing for the detection of errors in the header field, a data field of variable length, with each sector's data field being equal to the data field of every other sector, and ECC ("Error Correction Code") codes, which allow for the detection and correction of errors in the data.

When a disk is written to, the disk controller reads the header field and the header field code. If the sector is the desired sector and no header field error is detected, the new data is written into the data field and the new data ECC is written into the ECC field.

Reading operations are similar in that initially both the header field and header field error code are read. If no header field errors exist, the data and the data correction codes are read. If no error is detected the data is transmitted to the computer. If errors are detected, the error correction circuitry located within the disk controller tries to correct the error. If this is possible, the corrected data is transmitted. Otherwise, the disk drive's controller signals to the computer or master disk controller that an uncorrectable error has been detected.

In FIG. 2 a known disk drive system which has an associated error correction circuit, external to the individual disk controllers, is shown. This system uses a Reed-Solomon error detection code both to detect and correct errors. Reed-Solomon codes are known and the information required to generate them is described in many references. One such reference is *Practical Error Correction Design for Engineers,* published by Data Systems Technology Corp., Broomfield, Colo. For purposes of this application, it is necessary to know that the Reed-Solomon code generates redundancy terms, herein called P and Q redundancy terms, which terms are used to detect and correct data transmission errors. In the system shown in FIG. 2, ECC 42 unit is coupled to bus 45. The bus is individually coupled to a plurality of data disk drives, numbered here 47, 48, and 49, as well as to the P and Q term disk drives, numbered 51 and 53 through Small Computer Standard Interfaces ("SCSIs") 54 through 58. The American National Standard for Information Processing ("ANSI") has promulgated a standard for SCSI which is described in ANSI document number X3.130-1986. Bus 45 is additionally coupled to large output buffer 55. Buffer 55 is in turn coupled to computer 60. In this system, as blocks of data are read from the individual data disk drives, they are individually and serially placed on the bus and simultaneously transmitted both to the large buffer and the ECC unit. The P and Q terms from disk drives 51 and 53 are transmitted to ECC 42 only. The transmission of data and the P and Q terms over bus 45 occurs serially. The exact bus width can be any arbitrary size with 8- and 16-bit wide buses being common. After a large block of data is assembled in the buffer, the calculations necessary to detect and correct data errors, which use the terms received from the P and Q disk drives, are performed within the ECC unit 42. If errors are detected, the transfer of data to the computer is interrupted and the incorrect data is corrected, if possible.

During write operations, after a block of data is assembled in buffer 55, new P and Q terms are generated within ECC unit 42 and written to the P and Q disk drives at the same time that the data in buffer 55 is written to the data disk drives.

Those disk drive systems which utilize known error correction techniques have several shortcomings. In the systems illustrated in FIGS. 1 and 2, data transmission is serial over a single bus with a relatively slow rate of data transfer. Additionally, as the error correction circuitry must wait until a block of data of predefined size is assembled in the buffer before it can detect and correct errors therein, there is an unavoidable delay while such detection and correction takes place. As stated, the most common form of data transmission in these systems is serial data transmission. Given that the bus has a fixed width, it takes a fixed and relatively large amount of time to build up data in the buffer for transmission either to the disks or computer. Finally, if the large, single buffer fails, all the disk drives coupled thereto become unusable. Therefore, a system which has a plurality of disk drives which can increase the rate of data transfer between the computer and the disk drives and more effectively match the data transfer rate to the computer's maximum efficient operating speed is desirable. The system should also be able to conduct this high rate of data transfer while still performing all necessary error detection and correction functions. Finally, the system should provide an acceptable level of performance even when individual disk drives fail.

SUMMARY OF THE INVENTION

The present invention comprises an arrangement of data disk drives and error correction code disk drives, the drives being each individually coupled to a small output buffer memory and a circuit for error detection and correction. Error detection and correction occurs nearly simultaneously with the transfer of data to and from the disk drives. The multiple buffer memories can then be read from or written to in sequence for transfers on a data bus to the system computer. Additionally, the error correction circuitry can be connected to all of the buffer memory/disk drive data paths through a series of multiplexer circuits called cross-bar ("X-bar") switches. These X-bar switches can be used to decouple failed buffer memories or disk drives from the system.

As data is written to the drives, the error correction circuit, herein called the Array Correction Circuit ("ACC"), calculates P and Q redundancy terms and stores them on two designated P and Q disk drives through the X-bar switches. In contrast to the discussed prior art, the present invention's ACC detects and corrects errors across an entire group or array of disk drives simultaneously, hence the use of the term "Array Correction Circuit." In the following description, the term ACC will refer only to the circuit which performs the necessary error correction functions. The codes themselves will be referred to as Error Correction Code or "ECC." On subsequent read operations, the ACC compares the data read with the stored P and Q values to determine if the data is error-free. The X-bar switches have several internal registers. As data is transmitted to and from the data disk drives, it must go through an X-bar switch. Within the X-bar switch the data can be clocked from one register to the next before going to the output buffer or the disk drive. The time it takes to clock the data through the X-bar internal registers is sufficient to allow the ACC to calculate and perform its error correction tasks. During a write operation, this arrangement allows the P and Q values to be generated and written to their designated disk drives at the same time as the data is written to its disk drives, the operations occurring in parallel. In effect the X-bar switches establish a data pipeline of several stages, the plurality of stages effectively providing a time delay circuit.

In one preferred embodiment, two ACC units are provided. In one mode of operation, the second ACC performs the error detection and correction functions for a predefined number of the disk drives while the first ACC handles the same functions for the remainder of the disk drives. In another mode, the second ACC acts as a redundant back-up in the event of a failure of the first ACC.

The X-bar switch arrangement also provides flexibility in the data paths. Under control of the system controller, a malfunctioning disk drive can be decoupled from the system by reconfiguring the appropriate X-bar switch or switches and the data that was to be stored on the failed disk can be rerouted to another data disk drive. As the system computer is not involved in the detection or correction of data errors, or in reconfiguring the system in the case of failed drives or output buffers, these processes are said to be transparent to the system computer.

In a first embodiment of the present invention, a plurality of X-bar switches are coupled to a plurality of disk drives and output buffers, each X-bar switch having at least one data path to each output buffer and each disk drive. In operation any failure of any output buffer or disk drive may be compensated for by rerouting the data flow through any operational drive or buffer. In this embodiment full performance can be maintained even if several disk drives fail.

In another embodiment of the present invention, two ACC circuits are provided. In certain operating modes, such as when all the disk drives are being written to or read from simultaneously, the two ACC circuits are redundant, each ACC acting as a back-up unit to the other. In other modes, such as when data is written to an individual disk drive, the two ACCs work in parallel, each ACC performing a given action for a portion of the entire array, while the other ACC performs the same action for the remaining portions of the array.

In yet another embodiment, the ACC performs certain self-monitoring check operations using the P and Q redundancy terms to determine if the ACC itself is functioning properly. If these check operations fail, the ACC will indicate its failure to the control system, and it will not be used in any other operations.

In still another embodiment, the ACC unit is coupled to all the disk drives in the array and data being transmitted to or from the disk drives is simultaneously recovered by the ACC. The ACC performs error detection and error correction upon the transmitted data in parallel with the data's transmission from the output buffers to the disk drives or vice versa.

The present invention provides a speed advantage over the prior art by maximizing the use of parallel paths to the disk drives. Redundancy and thus fault-tolerance is also provided by the described arrangement of the X-bar switches and ACC units.

BRIEF DESCRIPTION OF THE DRAWINGS

FIG. 1 is a high level block diagram of a prior art disk drive memory system and computer;

FIG. 2 is a high level block diagram of another known mass storage system which uses an ECC;

FIG. 3 is a block diagram of the operating environment of the present invention;

FIG. 4 is a block diagram of one preferred embodiment of the present invention;

FIG. 5 is a block diagram of a second preferred embodiment of the present invention;

FIG. 6 is a detailed block diagram of the X-bar switches and the ACC shown in FIG. 5;

FIGS. 7a and 7b shows the logic operations necessary to calculate the P and Q error detection terms;

FIGS. 8a and 8b show how the Reed-Solomon codeword is formed and stored in one embodiment of the present invention;

FIGS. 9a and 9b show the parity detector and parity generator circuits in the ACC; and FIGS. 10, 11, 12, and 13 show, respectively, the data flow during a Transaction Mode Normal Read, a Transaction Mode Failed Drive Read, a Transaction Mode Read-Modify-Write Read and a Transaction Mode Read-Modify-Write Write.

DETAILED DESCRIPTION OF THE PREFERRED EMBODIMENTS

The preferred embodiments of the present invention comprise a system for mass data storage. In the preferred embodiments described herein, the preferred devices for storing data are hard disk drives, referenced herein as disk drives. Nothing herein should be understood to limit this invention to using disk drives only. Any other device for storing binary data may be used, including, but not limited to, floppy disks, magnetic tape drives, and optical disks.

Overall System Environment

One preferred embodiment of the present invention operates in the environment shown in FIG. 3. In FIG. 3, computers 13 and 15 are coupled to Dynamic Storage Controllers ("DSCs") 70 and 72 by means of bus 17. In turn, each DSC can be coupled to up to four Parallel Device Arrays ("PDAs"), PDAs 74 and 76 being shown. Each PDA is comprised internally of up to two Parallel Array Controllers ("PACs"), herein numbered 78, 80, 82 and 84. Each PAC is controlled by a microprocessor herein called the PAC engine and numbered 86 through 89. Finally, each PAC can be coupled to up to 39 disk drives, the disk drives being arranged in three arrays of 13 drives each, the first drive in each array being shown. Each group of drives is connected to its own buffer in the PAC. In terms of function, the DSC controls operations with regards to the computers 13 and 15. The PDA and, more accurately, the PAC allow for the implementation of the parallel array. The DSC may be adapted to operate with the different bus structures used by different computers.

Rerouting Data Paths Between Buffers and Disk Drives

FIG. 4 illustrates a first preferred embodiment of the present invention. In FIG. 4, X-bar switches 110 through 115 are coupled to a bus 90 communicating with the PAC engine (see FIG. 3). In turn, each X-bar switch is coupled by a bus to disk drives 120 through 125 and to each output buffer 130 through 136. Bus 150 couples each output buffer to a computer such as computers 13 and 15. In this embodiment, although only six disk drives are illustrated, any arbitrary number could be used, as long as the illustrated architecture is preserved by increasing the number of X-bar switches and output buffers in a like manner and maintaining the interconnected bus structures illustrated in FIG. 4. In operation, the PAC engine will load various registers (not illustrated herein) which configure the X-bar switches to communicate with particular output buffers and particular disk drives. The particular configuration can be changed at any time while the system is operating. Data flow is bi-directional over all the buses. By configuring the X-bar switches, data flowing from any given output buffer may be sent to any given disk drive or vice versa. Failure of any particular system element does not result in any significant performance degradation, as data flow can be routed around the failed element by reconfiguring the registers for the X-bar switch. In a preferred mode of operation, data may be transferred from or to a particular disk drive in parallel with other data transfers occurring in parallel on every other disk drive. This mode of operation allows for a very high rate of data throughput.

To illustrate this embodiment's mode of operation, the following example is offered. Referring to FIG. 4, assume that all data flow is initially direct, meaning, for example, that data in output buffer 130 flows directly through X-bar switch 110 to disk drive 120. Were buffer 130 to fail, X-bar switch 110's registers could be reconfigured, enabling X-bar switch 110 to read data from buffer 135 and direct that data to disk drive 120. Similar failures in other buffers and in the disk drives could be compensated for in the same manner.

Generation of Redundancy Terms and Error Detection on Parallel Data

FIG. 5 illustrates a second preferred embodiment of the present invention. This second embodiment incorporates Array Correction Circuits ("ACCs") to provide error detection and correction capabilities within the same general architecture as illustrated for the first preferred embodiment shown in FIG. 4. In order to ease the understanding of this embodiment, the full details of the internal structure of both the X-bar switches (210 through 215) and the ACC circuits 260 and 270 are not shown in FIG. 5. FIG. 6 illustrates the internal structure of these devices and will be referenced and discussed in turn. Additionally, bus LBE as illustrated in FIG. 5 does not actually couple the PAC engine (FIG. 3) directly to the X-bar switches, the ACCs, and the DSI units. Instead, the PAC engine communicates with various sets of registers assigned to the X-bar switches, the ACCs and the DSI units. These registers are loaded by the PAC engine with the configuration data which establishes the operating modes of the aforementioned components. As such registers are known, and their operation incidental to the present invention, they are not illustrated or discussed further herein.

The embodiment shown in FIG. 5 shows data disk drives 250 through 253 and P and Q redundancy term drives 254 and 255. A preferred embodiment of the present invention utilizes 13 disk drives: ten for data, two for P and Q redundancy terms, and one spare drive. It will be understood that the exact number of drives, and their exact utilization may vary without in any way changing the present invention. Each disk drive is coupled by a bi-directional bus (Small Computer Standard Interface) to units 220 through 225, herein labelled DSI. The DSI units perform some error detecting functions as well as buffering data flow into and out of the disk drives.

Each DSI unit is in turn coupled by a bi-directional bus means to an X-bar switch, the X-bar switches herein numbered 210 through 215. The X-bar switches are coupled in turn to word assemblers 230 through 235 by means of a bi-directional bus. The bus width in this embodiment is 9 bits, 8 for data, 1 for a parity bit. The word assemblers assemble 36-bit words for transmission to output buffers 240 through 245 over bi-directional buses having a 36-bit width. When data flows from the output buffers to the X-bar switches, the word assemblers decompose the 36-bit words into 9-bit blocks of data and parity.

The X-bar switches are also coupled to ACC units 260 and 270. The interconnection between the X-bar switches and the ACCs is shown in more detail in FIG. 6. Each X-bar switch can send to both or either ACC the 8 bits of data and 1 parity bit that the X-bar switch receives from either the DSI units or the word assemblers. In turn, the X-bar switches can receive 9 bits of the P and Q redundancy terms calculated by the ACCs over lines $E_1$ and $E_2$. As shown, the ACCs can direct the P and Q redundancy terms to any X-bar switch, not being limited to the disk drives labelled P and Q. Depending on the configuration commanded by the PAC engine, ACCs 260 and 270 can be mutually redundant, in which case the failure of one or the other ACC does not affect the system's ability to detect or correct errors, or each ACC can detect and correct errors on a portion of the total array of disk drives. When operating in this second manner, certain specific types of operations which write data to individual disk drives are expedited, as each ACC can write to a separate individual disk drive. The specific disk drives that the individual ACCs monitor can be reconfigured at any time by the PAC engine.

The illustrated connections of the ACCs and the X-bar switches also allows data to be switched from any X-bar switch to any other, once the PAC engine configures the related registers. This flexibility allows data to be routed away from any failed disk drive or output buffer.

FIG. 6 shows important internal details of the ACCs and the X-bar switches. X-bar switch 210 is composed of two mirror-image sections. These sections comprise, respectively, 9-bit tri-state registers 350/360, multiplexers 352/362, first 9-bit registers 354/364, second 9-bit registers 356/366, and input/output interfaces 259/269. In operation, data can flow either from the word assembler to the DSI unit or vice versa, but simultaneous two-way traffic is not permitted.

Although many pathways through the X-bar switch are possible, as shown by FIG. 6, two aspects of these pathways are of particular importance. First, in order to allow the ACC sufficient time to calculate P and Q redundancy terms or to detect and correct errors, a data pathway of several registers can be used, the data requiring one clock cycle to move from one register to the next. By clocking the data through several registers, a delay of sufficient length can be achieved. For example, assuming a data flow from the word assembler unit to a disk drive, 9 bits are clocked into 9-bit register 354 and tri-state register 350 on the first clock pulse. On the next clock pulse, the data moves to 9-bit register 366 and through redundancy circuit 302 in the ACC 260 to P/Q registers 304 and 306. The next clock pulses move the data to the DSI unit.

The second important aspect of the internal pathways relates to the two tri-state registers. The tri-state registers are not allowed to be active simultaneously. In other words, if either tri-state register 350 or 360 is enabled, its counterpart is disabled. This controls data transmission from the X-bar switch to the ACC. The data may flow only from the DSI unit to the ACC or from the word assembler to the ACC, but not from both to the ACC simultaneously.

ACC unit 260 comprises a redundancy circuit 302, wherein P and Q redundancy terms are generated, P and Q registers 304 and 306, wherein the P and Q redundancy terms are stored temporarily, regenerator and corrector circuit 308, wherein the data from or to a failed disk drive output or buffer can be regenerated or corrected, and output interfaces 310, 311, 312 and 313.

Redundancy Generation and Error Checking Equations

The main functional components of the second preferred embodiment and their physical connections to one another have now been described. The various preferred modes of operation will now be described. In order to understand these functional modes, some understanding of the error detection and correction method used by the present invention will be necessary.

Various error detection and correction codes are known and used in the computer industry. *Error-Control Coding and Applications*, D. Wiggert, The MITRE Corp., describes various such codes and their calculation. The present invention in this second preferred embodiment is implemented using a Reed-Solomon error detection and correction code. Nothing herein should be taken to limit the present invention to using only a Reed-Solomon code. If other codes were used, various modifications to the ACCs would be necessary, but these modifications would in no way change the essential features of this invention.

Reed-Solomon codes are generated by means of a field generator polynomial, the one used in this embodiment being $X^4+X+1$. The code generator polynomial needed for this Reed-Solomon code is $(X+a^0) \cdot (X+a^1) = X^2 + a^4 X + a^1$. The generation and use of these codes to detect and correct errors is known.

The actual implementation of the Reed-Solomon code in the present invention requires the generation of various terms and syndromes. For purposes of clarity, these terms are generally referred to herein as the P and Q redundancy terms. The equations which generate the P and Q redundancy terms are:

$$P = d_{n-1} + d_{n-2} + \ldots + d_1 + d_0 \text{ and}$$

$$Q = d_{n-1} \cdot a_{n-1} + d_{n-2} \cdot a_{n-2} + \ldots + d_1 \cdot a_1 + d_0 \cdot a_0.$$

The P redundancy term is essentially the simple parity of all the data bytes enabled in the given calculation. The Q logic calculates the Q redundancy for all data bytes that are enabled. For Q redundancy, input data must first be multiplied by a constant "a" before it is summed. The logic operations necessary to produce the P and Q redundancy terms are shown in FIGS. 7a and 7b. All operations denoted by $\oplus$ are exclusive-OR ("XOR") operations. Essentially, the final P term is the sum of all $P_i$ terms. The Q term is derived by multiplying all $Q_i$ terms by a constant and then XORing the results. These calculations occur in redundancy circuit 302 in ACC 260 (FIG. 6). The second preferred embodiment, using its implementation of the Reed-Solomon code, is able to correct the data on up to two failed disk drives.

The correction of data requires the generation of additional terms $S_0$ and $S_1$ within the ACC. Assuming that the P and Q redundancy terms have already been calculated for a group of data bytes, the syndrome equations $$S_0 = d_{n-1} + d_{n-2} + \ldots + d_1 + d_0 + P$$

$$S_1 = (d_{n-1} \cdot a_{n-1}) + (d_{n-2} \cdot a_{n-2}) + \ldots + (d_1 \cdot a_1) + (d_0 \cdot a_0) + Q$$

are used to calculate $S_0$ and $S_1$. For $S_0$ an ACC register enables the necessary data bytes and the P redundancy to be used in the calculation. For $S_1$, the necessary input data must first be multiplied by $a_i$ before being summed with the Q redundancy information.

As stated, an ACC can correct the data on up to two failed disk drives in this embodiment. The failed disk drive register (not illustrated) in the relevant ACC will be loaded with the address of the failed disk or disks by the PAC engine. A constant circuit within the ACC will use the drive location information to calculate two constants $k_0$ and $k_1$ as indicated in Table 1 below, where i represents the address of the first failed disk drive, j is the address of the second failed disk drive, and a is a constant. The columns labelled Failed Drives indicate which drives have failed. Column $k_0$ and $k_1$ indicate how those constants are calculated given the failure of the drives noted in the Failed Drives columns.

TABLE 1

| Failed Drives | | $k_0$ | $k_1$ |
|---|---|---|---|
| P | — | 0 | 1 |
| Q | — | 1 | 0 |
| i | — | 0 | 1/ai |
| i | P | 0 | 1/ai |
| Q | i | 0 | 0 |
| i | j | aj/ai + aj | 1/ai + aj |
| P | Q | 0 | 0 |

The error correction circuits use the syndrome information $S_0$ and $S_1$, as well as the two constants $k_0$ and $k_1$ to generate the data contained on the failed disk drives. The error correction equations are as follows:

$$F_1 = S_0 \cdot k_0 + S_1 \cdot k_1$$

$$F_2 = S_0 + E_1$$

$F_1$ is the replacement data for the first failed disk drive. $F_2$ is the replacement data for the second failed disk drive. The equations which generate the P and Q redundancy terms are realized in combinatorial logic, as is partially shown in FIGS. 7a and 7b. This has the advantage of allowing the redundancy terms to be generated and written to the disk drives at the same time that the data is written to the drives. This mode of operation will be discussed later.

Operational Modes

Having described the aspects of the Reed-Solomon code implementation necessary to understand the present invention, the operational modes of the present invention will now be discussed.

The second preferred embodiment of the present invention operates primarily in one of two classes of operations. These are parallel data storage operations and transaction processing operation. These two classes of operations will now be discussed with reference to the figures, particularly FIGS. 5, 8 and 9 and Tables 2 through 7.

Although FIG. 5 only shows 4 data drives and the P and Q redundancy term drives, a preferred embodiment uses an array of 13 disk drives, 10 for data, 2 for the P and Q terms, and a spare. Although nothing herein should be construed to limit this discussion to that specific embodiment, parallel processing operations will be described with relation to that environment.

Parallel Processing Operations

In parallel processing operations, all the drives are considered to comprise a single large array. Each of the disk drives will either receive or transmit 9 bits of data simultaneously. The result of this is that the 9-bit blocks of data appearing in the DSI units of all the drives simultaneously are treated as one large codeword. This result is shown in FIG. 8a. Codeword 400 comprises 9 bits of data from or for disk drive $d_{n-1}$, 9 bits of data from or for disk drive $d_{n-2}$, and so on, with the P and Q disk drives receiving or transmitting the P and Q redundancy term. In a parallel write operation, all the disk drives in the array, except for the spare disk drive, will receive a block of data (or a redundancy term whose length is equal to the data block) simultaneously. As shown, the same sector in all the disk drives will receive a part of codeword 400. For example, in the illustration, sector 1 of disk drive $n-1$ will receive a block of data designated $d_{n-1}$ from codeword 400, sector 1 of disk drive $n-2$ will receive a block of data designated $d_{n-2}$ from codeword 400 and so on.

In the actual implementation of this preferred embodiment, the codewords are "striped" across the various disk drives. This means that for each successive codeword, different disk drives receive the P and Q redundancy terms. In other words, drive $d_{n-1}$ is treated as drive $d_{n-2}$ for the second codeword and so on, until what was originally drive $d_{n-1}$ receives a Q redundancy term. Thus, the redundancy terms "stripe" through the disk drives.

Pairs of P and Q Terms for Nibbles

Calculating the P and Q redundancy terms using 8-bit symbols would require a great deal of hardware. To reduce this hardware overhead, the calculations are performed using 4-bit blocks or nibbles. This hardware implementation does not change the invention conceptually, but does result in the disk drives receiving two 4-bit data nibbles combined to make one 8-bit block. In FIG. 8b, codeword 450, as well as the illustrated sectors A of the disk drives, illustrate how the codeword is broken up and how the disk drives receive upper and lower 4-bit nibbles. Table 2 shows how, for codewords one through N, a different portion of the codeword is placed on the different drives. Each disk drive, for a given codeword, receives an upper and lower 4-bit nibble, designated with L's and U's, of the codeword. Additionally, the same section is used to store the nibbles on each of the disk drives used to store the codeword. In other words, for codeword$_1$, the first sector of disk drives $n-1$ through 0 receives the nibbles.

TABLE 2

| | CODEWORD - DATA AND P AND Q | | | | |
|---|---|---|---|---|---|
| | Sector of Drive $d_{n-1}$ | Sector of Drive $d_{n-2}$ | Sector of Drive $d_0$ | Sector of Drive P | Sector of Drive Q |
| Codeword$_1$ | Codeword$_1$ $(d_{n-1L})(d_{n-1U})$ | Codeword$_1$ $(d_{n-2L})(d_{n-2U})$ | Codeword$_1$ $(d_{0L})(d_{0U})$ | Codeword$_1$ $(P_{1L})(P_{1U})$ | Codeword$_1$ $(Q_{1L})(Q_{1U})$ |
| Codeword$_2$ | Codeword$_2$ $(d_{n-1L})(d_{n-1U})$ | Codeword$_2$ $(d_{n-2L})(d_{n-2U})$ | Codeword$_2$ $(d_{0L})(d_{0U})$ | Codeword$_2$ $(P_{2L})(P_{2U})$ | Codeword$_2$ $(Q_{2L})(Q_{2U})$ |
| . | | | | | |
| Codeword$_n$ | Codeword$_n$ $(d_{n-1L})(d_{n-1U})$ | Codeword$_n$ $(d_{n-2L})(d_{n-2U})$ | Codeword$_n$ $(d_{0L})(d_{0U})$ | Codeword$_n$ $(P_{nL})(P_{nU})$ | Codeword$_n$ $(Q_{nL})(Q_{nU})$ |

Referring back to FIG. 5, for a parallel data write to the disks, the data is provided in parallel from buffers 240, 241, 242 and 243 along those data buses coupling the buffers to X-bar switches 210, 211, 212, and 213 after the 36-bit data blocks are disassembled in word assemblers 230 through 233 into 9-bit blocks. These X-bar switches are also coupled to inputs D3, D2, D1 and D0, respectively, of ACC 260 and ACC 270. In parallel processing modes, the two ACCs act as mutual "backups" to one another. Should one fail, the other will still perform the necessary error correcting functions. In addition to operating in a purely "backup" condition, the PAC engine can configure the ACCs so that each ACC is performing the error detection and correction functions for a portion of the array, the other ACC performing these functions for the remaining disk drives in the array. As the ACC units are still coupled to all the disk drives, failure of one or the other unit does not impact the system as the operating ACC can be reconfigured to act as the dedicated ACC unit for the entire array. For purposes of discussion, it is assumed here that ACC 260 is operating. ACC 260 will calculate the P and Q redundancy term for the data in the X-bar switches and provide the terms to its $E_1$ and $E_2$ outputs, which outputs are coupled to all the X-bar switches. For discussion only, it is assumed that only the $E_2$ connection of X-bar switch 214 and the $E_1$ connection of X-bar switch 215 are enabled. Thus, although the data is provided along the buses coupling ACC 260's $E_1$ and $E_2$ output to all the X-bar switches, the Q term is received only by X-bar switch 214 and the P term is received by X-bar switch 215. From thence the P and Q terms are provided first to DSI units 224 and 225 and then disk drives 254 and 255. It should be recalled that the various internal registers in the X-bar switches will act as a multi-stage pipeline, effectively slowing the transit of data through the switches sufficiently to allow ACC 260's redundancy circuit 302 to calculate the P and Q redundancy terms.

As ACC 270 is coupled to the X-bar switches in a substantially identical manner to ACC 260, the operation of the system when ACC 270 is operational is essentially identical to that described for ACC 260.

Subsequent parallel reads from the disks occur in the following manner. Data is provided on bi-directional buses to DSI units 220, 221, 222 and 223. P and Q redundancy terms are provided by DSI units 225 and 224, respectively. As the data and P and Q terms are being transferred through X-bar switches 210 through 215, ACC 260 uses the P and Q terms to determine if the data being received from the disk drives is correct. Word assemblers 230 through 233 assemble successive 9-bit blocks until a 36-bit word is available. This 36-bit word is forwarded to buffers 240 through 243. Note that the 9-bit blocks are transmitted to the buffers in parallel. If that data is incorrect, the PAC engine will be informed.

During a parallel read operation, in the event that there is a failure of a disk drive, the failed disk drive will, in certain instances, communicate to the PAC engine that it has failed. The disk drive will communicate with the PAC engine if the disk drive cannot correct the error using its own corrector. The PAC engine will then communicate with ACCs 260 and 270 by loading the failed drive registers in the ACC (not shown in the figures) with the address of the failed drive. The failed drive can be removed from the array by deleting its address from the configuration registers. One of the array's spare drives can then be used in place of the failed drive by inserting the address of the spare drive into the configuration registers.

The ACC will then calculate the replacement data necessary to rewrite all the information that was on the failed disk onto the newly activated spare. In this invention, the term spare drive indicates a disk drive which ordinarily does not receive or transmit data until another disk drive in the system has failed.

When the data, P, and Q bytes are received, the ACC circuits use the failed drive location in the failed drive registers to calculate replacement data for the failed drive. After the calculation is complete, the data bytes, including the recovered data, are sent to data buffers in parallel. Up to two failed drives can be tolerated with the Reed-Solomon code implemented herein. All operations to replace failed disk drives and the data thereon occur when the system is operating in a parallel mode.

Regeneration of data occurs under PAC engine control. When a failed disk drive is to be replaced, the ACC regenerates all the data for the replacement disk. Read/write operations are required until all the data has been replaced. The regeneration of the disk takes a substantial amount of time, as the process occurs in the background of the system's operations so as to reduce the impact to normal data transfer functions. Table 3 below shows the actions taken for regeneration reads. In Table 3, i represents a first failed drive and j represents a second failed drive. In Table 3, the column labelled Failed Drives indicates the particular drives that have failed. The last column describes the task of the ACC given the particular indicated failure.

TABLE 3

| Failed Drives | | Regeneration Read |
|---|---|---|
| P | — | ACC calculates P redundancy |
| Q | — | ACC calculates Q redundancy |
| i | — | ACC calculates replacement data for i drive |
| i | P | ACC calculates replacement data for i drive and P redundancy |
| Q | i | ACC calculates replacement data for i drive and Q redundancy |
| j | i | ACC calculates replacement data for i and j drives |
| P | Q | ACC calculates P and Q redundancy |

It should be noted that if both a data disk drive and a redundancy disk drive fail, the data on the data disk drive must be regenerated before the redundancy terms on the redundancy drive. During a regeneration write, regeneration data or redundancy terms are written to a disk and no action is required from the ACC logic.

During a parallel read operation, it should also be noted that additional error detection may be provided by the ACC circuitry.

Table 4 indicates what actions may be taken by the ACC logic unit when the indicated drive(s) has or have failed during a failed drive read operation. In this operation, the drives indicated in the Failed Drives columns are known to have failed prior to the read operation. The last column indicates the ACC response to the given failure.

TABLE 4

| Failed Drives | | |
|---|---|---|
| P | | No action by ACC |
| Q | | No action by ACC |
| i | | ACC calculates replacement data |
| i | P | ACC calculates the replacement data |
| Q | i | ACC calculates the replacement data |
| i | j | ACC calculates replacement data |

TABLE 4-continued

| Failed Drives | | |
|---|---|---|
| P | Q | No action by ACC |

Transaction Processing Mode: Read

Transaction processing applications require the ability to access each disk drive independently. Although each disk drive is independent, the ACC codeword with P and Q redundancy is maintained across the array in the previously described manner. For a normal read operation, the ACC circuitry is not generally needed. If only a single drive is read, the ACC cannot do its calculations since it needs the data from the other drives to assemble the entire codeword to recalculate P and Q and compare it to the stored P and Q. Thus, the data is assumed to be valid and is read without using the ACC circuitry (see FIG. 10). Where drive 252 is the one selected, the data is simply passed through DS1 unit 222 X-bar switch 212, word assembler 232 and buffer 242 to the external computer. If the disk drive has failed, the read operation is the same as a failed drive read in parallel mode with the exception that only the replacement data generated by the ACC is sent to the data buffer. In this case, the disk drive must notify the PAC engine that it has failed, or the PAC engine must otherwise detect the failure. Otherwise, the PAC engine will not know that it should read all the drives, unless it assumes that there might be an error in the data read from the desired drive. The failed drive read is illustrated in FIG. 11, with drive 252 having the desired data, as in the example of FIG. 10. In FIG. 11, the PAC engine knows that drive 252 has failed, so the PAC engine calls for a read of all drives, with the drive 252 data being reconstructed from the data on the other drives and the P and Q terms. Only the reconstructed data is provided to its buffer, buffer 242, since this is the only data the external computer needs.

Transaction Processing Mode: Write

When any individual drive is written to, the P and Q redundancy terms must also be changed to accommodate the new data. This is because the data being written over was part of a code word extending over multiple disk drives and having P and Q terms on two disk drives. The previously stored P and Q terms will no longer be valid when part of the codeword is changed, so new P and Q terms, P" and Q", must be calculated and written over the old P and Q terms on their respective disk drives. P" and Q" will then be proper redundancy terms for the modified code word.

One possible way to calculate P" and Q" is to read out the whole codeword and store it in the buffers. The new portion of the codeword for drive 252 can then be supplied to the ACC circuit along with the rest of the codeword, and the new P" and Q" can be calculated and stored on their disk drives as for a normal parallel write. However, if this method is used, it is not possible to simultaneously do another transaction mode access of a separate disk drive (i.e., drive 250) having part of the codeword, since that drive (250) and its buffer (240) are needed for the transaction mode write for the first drive (252).

According to a method of the present invention, two simultaneous transaction mode accesses are made possible by using only the old data to be written over and the old P and Q to calculate the new P" and Q" for the new data. This is done by calculating an intermediate P' and Q' from the old data and old P and Q, and then using P' and Q' with the new data to calculate the new P" and Q". This requires a read-modify-write operation on the P and Q drives. The equations for the new P and Q redundancy is:

New P redundancy (P") = (old P − old data) + new data

New Q redundancy (Q") = (old Q − old data·$a_i$) + new data·$a_i$

P' = old P − old data

Q' = old Q − old data·$a_i$

During the read portion of the read-modify-write, the data from the drive to be written to and the P and Q drives are summed by the ACC logic, as illustrated in FIG. 12. This summing operation produces the P' and Q' data. The prime data is sent to a data buffer. When the new data is in a data buffer, the write portion of the cycle begins as illustrated in FIG. 13. During this portion of the cycle, the new data and the P' and Q' data are summed by the ACC logic to generate the new P" and Q" redundancy. When the summing operation is complete, the new data is sent to the disk drive and the redundancy information is sent to the P and Q drives.

Parity Check of P and Q for Transaction Mode Write

During these read-modify-write operations, it is also possible that the ACC unit itself may fail. In this case, if the data in a single element were to be changed by a read-modify-write operation, a hardware failure in the ACC might result in the redundancy bytes for the new data being calculated erroneously. To prevent this occurrence, the parity detector and parity generator are made part of the ACC circuitry. This additional redundant circuit is shown in FIGS. 9a and 9b and resides within redundancy circuit 302 as shown in FIG. 6. When data is received by the ACC circuitry, parity is checked to insure that no errors have occurred using the P and Q redundancy terms. In calculating Q", new parity is generated for the product of the multiply operation and is summed with the parity of the old Q" term. This creates the parity for the new Q term. For the P byte, the parity bits from the data are summed with the parity bit of the old P term to create the new parity bit for the new P" term. Before writing the new data back to the disk drive, the parity of Q' (calculated as indicated previously) is checked. Should Q' be incorrect, the PAC engine will be informed of an ACC failure. In this manner, a failure in the ACC can be detected.

The same operations are performed for a failed disk drive write in transaction processing operations as for parallel data writes, except that data is not written to a failed drive or drives.

With respect to transaction processing functions during normal read operations, no action is required from the ACC logic. The actions taken by the ACC logic during a failed drive read in transaction processing mode are listed in Table 5 below, where i and j represent the first and second failed drives. The columns labelled Failed Drives indicate which drives have failed. The last column indicates what action the ACC may or may not take in response to the indicated failure.

TABLE 5

| Failed Drives | | |
|---|---|---|
| P | — | Redundancy drives are not read; no ACC action |

TABLE 5-continued

| Failed Drives | | |
|---|---|---|
| Q | — | Redundancy drives are not read; no ACC action |
| i | — | ACC logic calculates replacement data and performs a parallel read |
| i | P | ACC logic calculates replacement data and performs a parallel read |
| Q | i | ACC logic calculates replacement data and performs a parallel read |
| j | i | ACC logic calculates replacement data and performs a parallel read |
| P | Q | No ACC action as only data disk drives are read |

If two data disk drives fail, the ACC logic must calculate the needed replacement data for both disk drives. If only one failed drive is to be read, both failed drives must still be noted by the ACC logic.

In the read-before-write operation (part of the read-modify-write process), the ACC logic generates P' and Q' redundancy terms. Table 6 shows the action taken by the ACC logic when a failed disk drive read precedes a write in this process. Again, i and j represent the first and second failed drives. The columns headed by Failed Drives indicate which drives have failed, and the last column denotes the response of the ACC to the indicated failures.

TABLE 6

| Failed Drives | | |
|---|---|---|
| P | — | ACC calculates Q' only |
| Q | — | ACC calculates P' only |
| i | — | ACC logic takes no action and all good data disk drives are read into data buffers |
| i | P | All good data disk drives are read into data buffers |
| Q | i | All good data disk drives are read into data buffers |
| i | j | All good data disk drives are read into data buffers |
| i | failed drive | Perform a parallel read, the ACC logic calculates the replacement data for the jth failed drive. Next, the remaining good data disk drives are read into the data buffers. |
| P | Q | No read before write operation is necessary |

When a failed data disk drive is to be written, all good data disk drives must be read so that a new P and Q redundancy can be generated. All of the data from the good data disk drive and the write data is summed to generate the new redundancy. When two data disk drives fail, the ACC logic must calculate replacement data for both failed drives. If only one drive is to be read, both must be reported to the ACC logic.

During write operations, the ACC continues to calculate P and Q redundancy. Table 7 shows the ACC's tasks during failed drive writes. Here P and Q represent the P and Q redundancy term disk drives, and i and j represent the first and second failed data disk drives. The columns Failed Drives denote the particular failed drives, and the last column indicates the ACC response to the failed drives.

TABLE 7

| Failed Drives | | |
|---|---|---|
| P | — | ACC calculates Q redundancy only |
| Q | — | ACC calculates P redundancy only |
| i | — | ACC calculates P and Q redundancy |
| i | P | ACC calculates Q redundancy only |
| Q | i | ACC calculates P redundancy only |
| i | j | ACC calculates P and Q redundancy |
| P | Q | ACC logic takes no action |

SUMMARY

The interconnected arrangements herein described relative to both preferred embodiments of the present invention allow for the simultaneous transmission of data from all disks to the word assemblers or vice versa. Data from or to any given disk drive may be routed to any other word assembler through the X-bar switches under PAC engine control. Additionally, data in any word assembler may be routed to any disk drive through the X-bar switches. The ACC units receive all data from all X-bar switches simultaneously. Any given disk drive, if it fails, can be removed from the network at any time. The X-bar switches provide alternative pathways to route data or P and Q terms around the failed component.

The parallel arrangement of disk drives and X-bar switches creates an extremely fault-tolerant system. In the prior art, a single bus feeds the data from several disk drives into a single large buffer. In the present invention, the buffers are small and one buffer is assigned to each disk drive. The X-bar switches, under control of the ACC units, can route data from any given disk drive to any given buffer and vice versa. Each PAC has several spare disks and one spare buffer coupled to it. The failure of any two disks can be easily accommodated by switching the failed disk from the configuration by means of its X-bar switch and switching one of the spare disks onto the network. The present invention thus uses the error detection and correction capabilities of a Reed-Solomon error correction code in an operational environment where the system's full operational capabilities can be maintained by reconfiguring the system to cope with any detected disk or buffer failure. The ACC can correct and regenerate the data for the failed disk drive and, by reconfiguring the registers of the failed and spare disk drives, effectively remove the failed drive from the system and regenerate the data from the failed disk onto the spare disk.

Although particular embodiments of the invention have been described and illustrated herein, it is recognized that many modifications and variations not discussed herein may readily occur to those skilled in the art, and consequently it is intended that the claims be interpreted to cover such modifications and equivalents.

We claim:

1. An interface for connecting to a plurality of memory storage means comprising:
   a plurality of output buffer means coupled to a first bus;
   a plurality of cross-bar switches, each individual cross-bar switch being coupled to only a single one of said individual memory storage means by a bi-directional bus means and to an individual output buffer means by a bi-directional bus means, all of said cross-bar switches being coupled to each other each cross-bar switch providing a pair of data paths, a first one of said data paths having means for delaying data; and
   control means coupled to each cross-bar switch for controlling the cross-bar switches to allow data both to flow from any selected output buffer means to any selected memory storage means and to flow from any selected memory storage means to any selected output buffer means, and to select between said data paths.

2. A system for transferring data from a computer to a plurality of data storage means, comprising:

a plurality of buffer means, each buffer means being coupled by a bus means to the computer;

a plurality of switching means, each switching means being coupled both to a data storage means by a bi-directional bus means and to a buffer means by a bi-directional bus means, each switching means providing a pair of data paths, a first one of said data paths having a means for delaying data;

error detection and correction means, coupled individually to each switching means by a bus means, for detecting and correcting errors in the data as the data is transmitted in parallel both from the buffer means to the data storage means through the switching means and from the data storage means to the buffer means through the switching means; and control means, coupled to the error detection and correction means, for controlling the error detection and correction means and selecting one of said data paths.

3. The system of claim 2 wherein the control means is additionally coupled to the data storage means and the buffer means, the control means receiving from the data storage means and the buffer means the locations of failed buffer means and failed data storage means, the control means electronically decoupling the failed buffer means and/or data storage means from the system.

4. The system of claim 2 wherein the error detection and correction means uses a Reed-Solomon error correction code to detect and correct the errors in the data received from the data buffer means and the data storage means.

5. The system of claim 2 further comprising a plurality of switches coupling said buffer means to said data storage means and control means coupled to said switches for electronically removing from the system any data storage means and buffer means which transmits erroneous data.

6. The interface of claim 1 wherein said means for delaying comprises at least one register.

7. The interface of claim 1 wherein said control means includes a multiplexer coupled to said data paths.

8. The interface of claim 1 further comprising a plurality of word assembler means, each coupled between one of said buffer means and one of said cross-bar switches, for converting from an N bit path to an M times N bit path.

9. The system of claim 2 wherein said first path is coupled to said error detection and correction means and delays data for error checking by said error detection and correction means.

* * * * *